United States Patent
Fan-Chiang et al.

(10) Patent No.: US 6,474,657 B1
(45) Date of Patent: Nov. 5, 2002

(54) CHUCK DEVICE

(76) Inventors: Wei-Chuan Fan-Chiang, 7, 12th Rd., Da-Li Industrial Park, Da-Li City, Taichung Hsien (TW); Mu-Mao Tseng, 7, 12th Rd., Da-Li Industrial Park, Da-Li City, Taichung Hsien (TW); Shih-Yueh Chen, 7, 12th Rd., Da-Li Industrial Park, Da-Li City, Taichung Hsien (TW)

( * ) Notice: Subject to any disclaimer, the term of this patent is extended or adjusted under 35 U.S.C. 154(b) by 24 days.

(21) Appl. No.: 09/835,235

(22) Filed: Apr. 16, 2001

(51) Int. Cl.[7] ................................................ B23B 31/12
(52) U.S. Cl. .......................................... 279/62; 279/902
(58) Field of Search ............................ 279/61, 62, 902; 81/59.1

(56) References Cited

U.S. PATENT DOCUMENTS

| | | | |
|---|---|---|---|
| 897,335 A | * | 9/1908 | Almond |
| 1,417,981 A | * | 5/1922 | Englund |
| 1,476,903 A | * | 12/1923 | McConnell |
| 2,292,470 A | * | 8/1942 | Ostberg |
| 3,807,745 A | * | 4/1974 | Bent |
| 5,348,318 A | * | 9/1994 | Steadings |
| 5,531,139 A | * | 7/1996 | Fanchang |
| 6,010,135 A | * | 1/2000 | Miles |
| 6,398,226 B1 | * | 6/2002 | Huggins |

* cited by examiner

Primary Examiner—Sebastiano Passaniti
(74) Attorney, Agent, or Firm—Charles E. Baxley

(57) ABSTRACT

A chuck device includes a tube with a plurality of inclined holes defined therethrough and a plurality of clamping members are respectively inserted in the inclined holes. Each clamping member has teeth defined in an outside thereof. A nut is mounted to the tube and has threads defined in an inner periphery thereof so as to be engaged with the teeth of the clamping members. A groove is defined in the inner periphery of the nut and balls are received in the groove. A pressing ring is received in the nut and positions the balls. A sleeve is mounted to the nut and has protrusions on an inner periphery of the sleeve, the protrusions being engaged with notches defined in an outer periphery of the nut. When rotating the sleeve, the nut is rotated to move the clamping members.

3 Claims, 5 Drawing Sheets

CHUCK DEVICE

FIELD OF THE INVENTION

The present invention relates to a chuck device wherein a nut has threads for engagement with teeth of clamp members, and a groove for receiving balls therein so that the nut is rotated smoothly.

BACKGROUND OF THE INVENTION

A conventional chuck device for clamping a tool such as a bit is shown in FIG. 5 and generally includes a tube 10 with inclined holes defined therethrough and the holes communicate with a central passage of the tube 10. Each of the holes has a clamping member 11 movably received therein and each clamping member 11 has teeth 12 defined in a periphery thereof. A nut 13 is mounted to the tube 10 and has threads defined in an inner periphery thereof, the threads of the nut 13 are engaged with the teeth 12 of each of the clamping members 11. A bearing 14 is located between the nut 13 and a flange of the tube 10, so that the nut 13 can be rotated smoothly. A sleeve 15 is mounted to the nut 13 and the tube 10, the sleeve 15 is co-rotatably connected to the nut 13 so that when rotating the sleeve 15, the nut 13 is rotated to move the clamping members 11. However, because the nut 13 is cooperated with the bearing 14, the manufacturers have to prepare bearings 14 besides the nuts 13, the tubes 10, the clamping members 11 and the sleeves 15. The bearings 14 make the cost of manufacture of the chuck on a high level. Besides, the assembly for the bearing 14 and the nut 13 requires skilled persons and takes a lot of time. A tolerance between the bearing 14 and the nut 13 will affect the friction between these two parts and could generate noise.

SUMMARY OF THE INVENTION

In accordance with one aspect of the present invention, there is provided a chuck device and comprises a tube having a central passage and a plurality of inclined holes which communicate with the central passage. A plurality of recesses are defined in an outer surface of the tube and communicate with the inclined holes. A plurality of clamping members are respectively inserted in the inclined holes and each clamping member has teeth defined in an outside thereof. The teeth are accessed in the recesses. A nut is mounted to the tube and has threads defined in an inner periphery thereof. The threads are engaged with the teeth of the clamping If members. A groove is defined in the inner periphery of the nut so as to receive balls therein which are positioned by a pressing ring. An engaging groove is defined in the inner periphery of the nut and a C-shaped clamp is engaged with the engaging groove so as to position the pressing ring.

The primary object of the present invention is to provide a chuck device wherein the bearing is make with the nut as a one-piece member.

The present invention will become more obvious from the following description when taken in connection with the accompanying drawings which show, for purposes of illustration only, two preferred embodiments in accordance with the present invention.

DETAILED DESCRIPTION OF THE PREFERRED EMBODIMENTS

Figure 1:
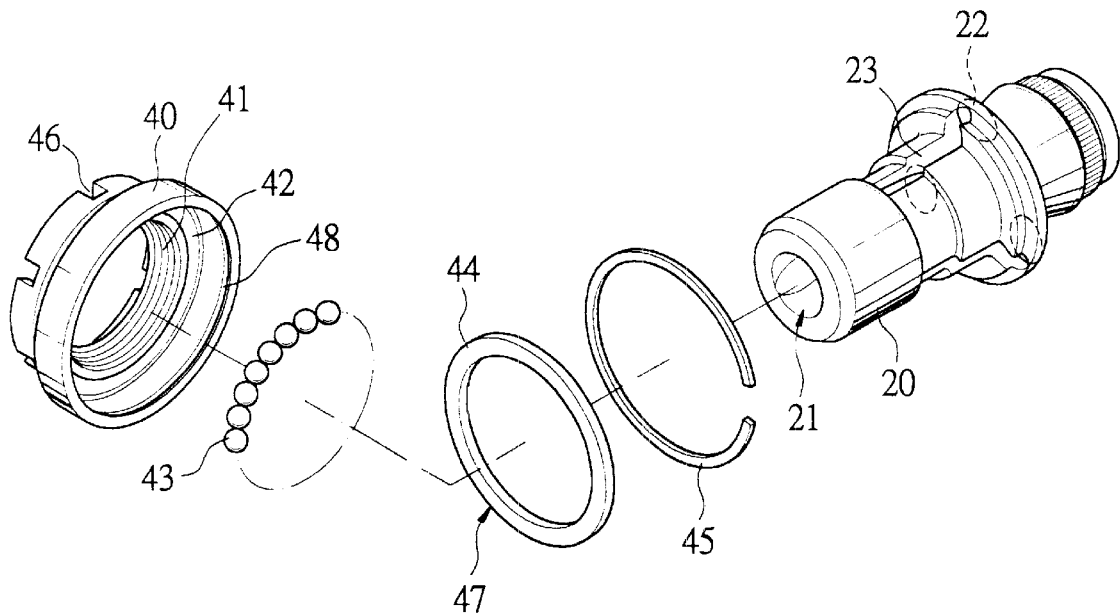
FIG. 1 is an exploded view to show a chuck device of the present invention.
Figure 2:
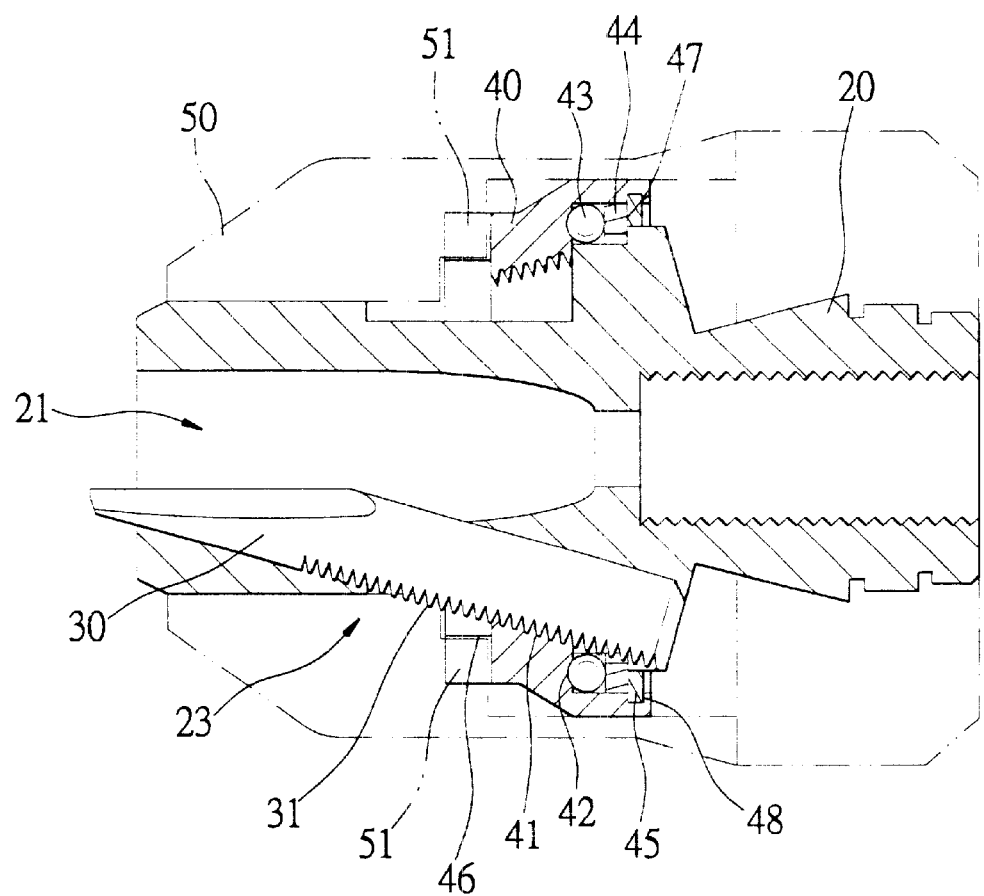
FIG. 2 is a cross sectional view to show the chuck device of the present invention.
Figure 3:
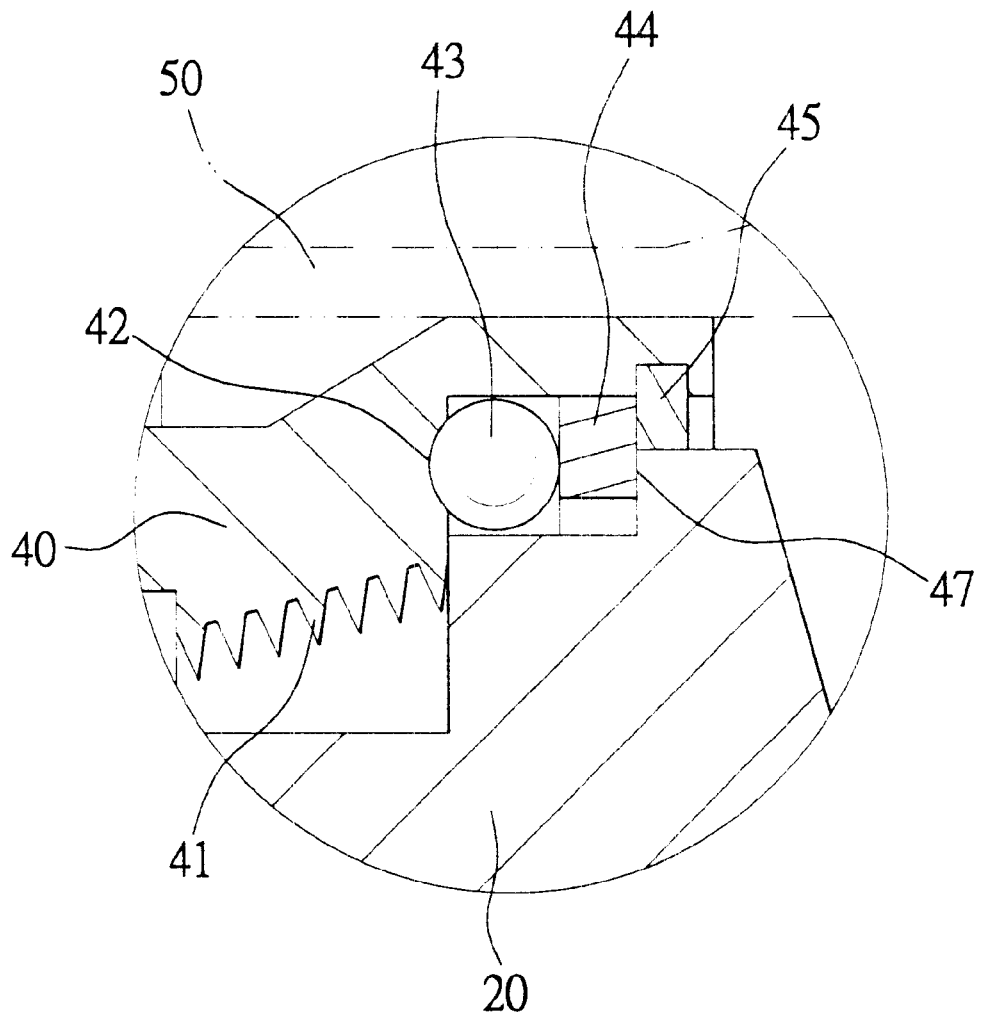
FIG. 3 is an enlarged cross sectional view to show how the balls are positioned in the nut by the pressing ring.

Referring to FIGS. 1 to 3, the chuck device of the present invention comprises a tube 20 having a central passage 21 and a plurality of inclined holes 22 are defined through the tube 20 and communicate with the central passage 21. A plurality of recesses 23 are defined in an outer surface of the tube 20 and communicate with the inclined holes 22. A plurality of clamping members 30 are respectively inserted in the inclined holes 22 and each clamping member 30 has teeth 31 defined in an outside thereof. The teeth 31 of each of the clamping members 30 is accessed in the recesses 23 and a tip end of each of the clamping members 30 is movable in the central passage 21 so as to clamp a tool or a bit in the central passage 21.

Figure 4:
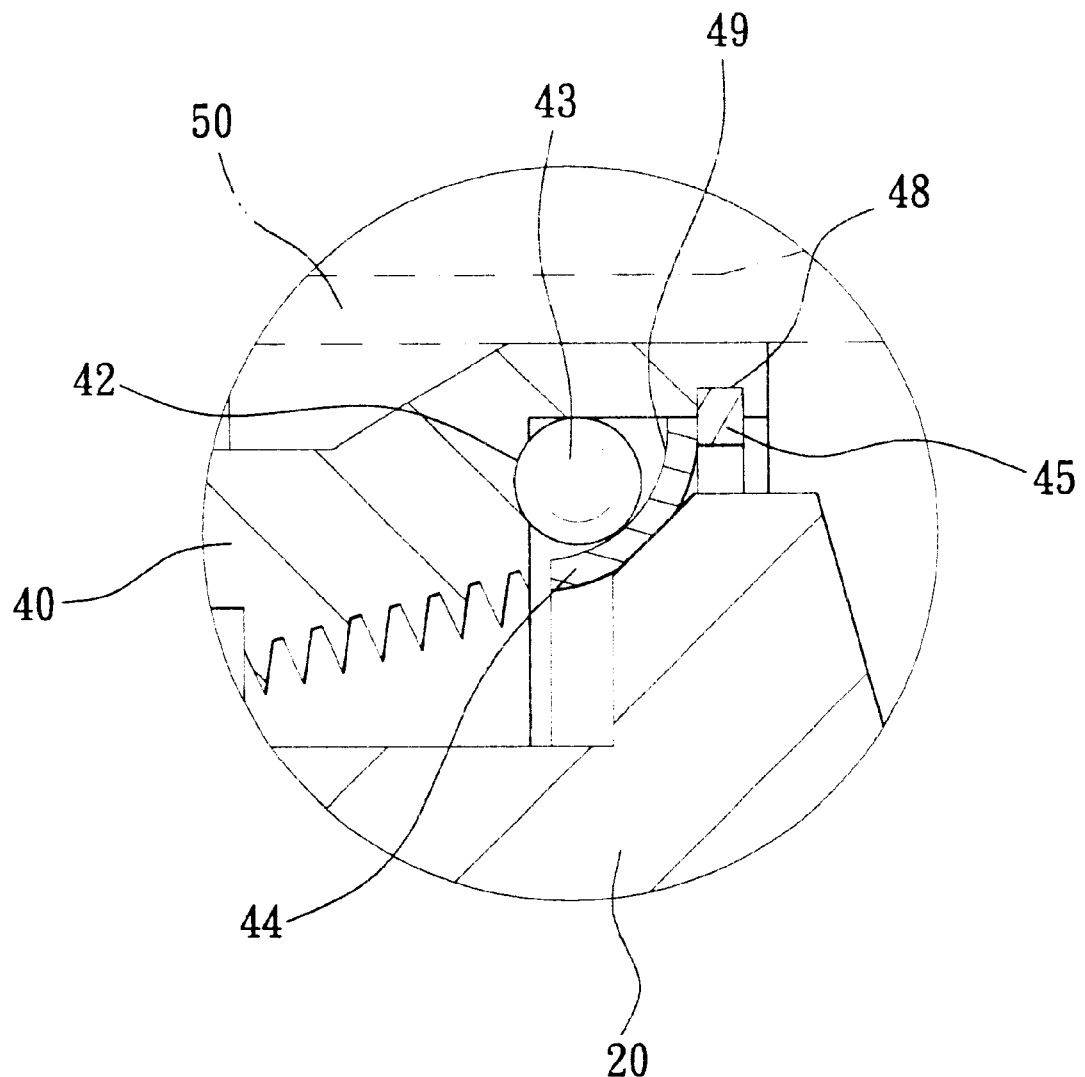
FIG. 4 is an enlarged cross sectional view to show another embodiment of the pressing ring.
Figure 5:
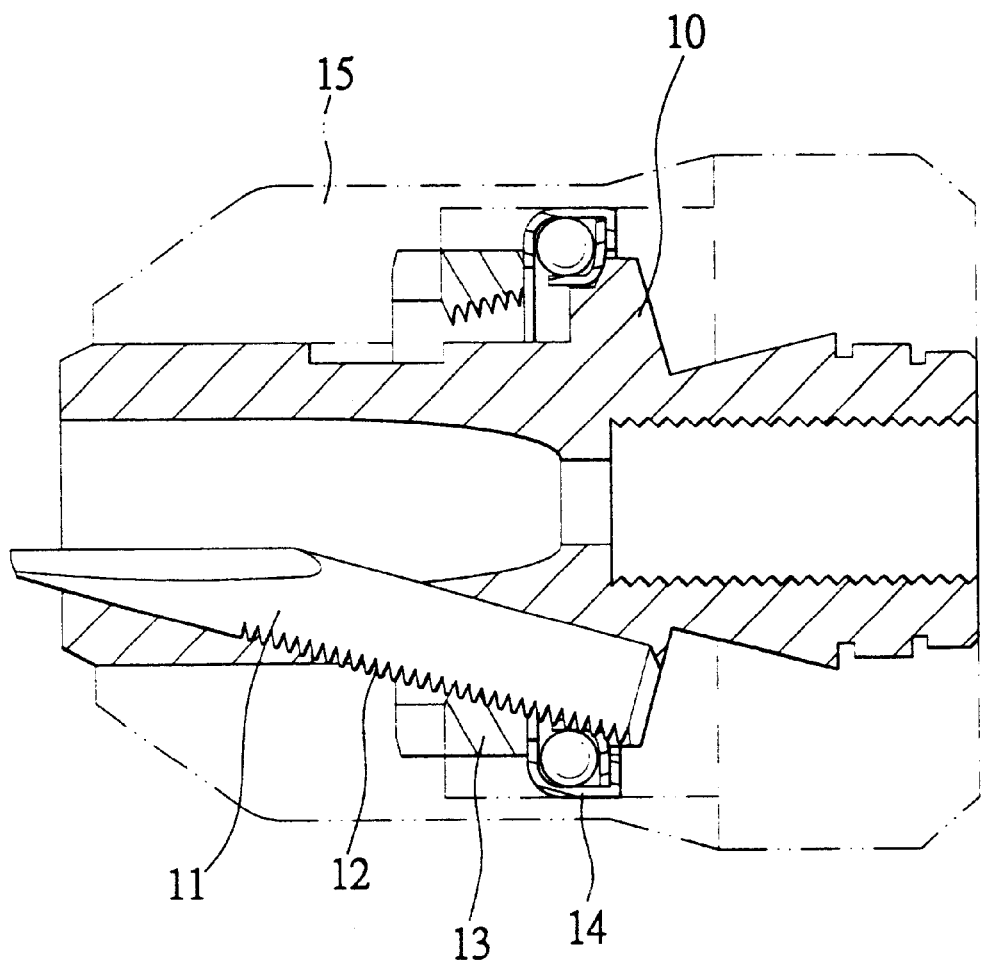
FIG. 5 is a cross sectional view to show a conventional chuck device.

A nut 40 is mounted to the tube 20 and has threads 41 defined in an inner periphery thereof. The threads 41 are engaged with the teeth 31 of the clamping members 30. A groove 42 is defined in the inner periphery of the nut 40 and a plurality of balls 43 are received in the groove 42. The balls 43 are positioned by a pressing ring 44. The pressing ring 44 has a contact surface 47 which is designed to retain the balls 43. The contact surface of the pressing ring 44 can also be made to be a curved surface 49 such as shown in FIG. 4. An engaging groove 48 is defined in the inner periphery of the nut 40 and a C-shaped clamp 45 is engaged with the engaging groove 48 so as to position the pressing ring 44.

A plurality of notches 46 are defined in an outer periphery of the nut 40 and a sleeve 50 is mounted to the nut 40. The sleeve 50 has protrusions 51 extending from an inner periphery thereof and engaged with the notches 46 of the nut 40. Therefore, when rotating the sleeve 50, the nut 40 is rotated and the clamping members 30 are moved by the engagement of the threads 41 of the nut 40 and the teeth 31 of the clamping members 30.

The balls 43 are received in the groove 42 in the nut 44 so that the assembling processes and cost of manufacturing are simplified and reduced.

While we have shown and described various embodiments in accordance with the present invention, it should be clear to those skilled in the art that further embodiments may be made without departing from the scope of the present invention.

What is claimed is:

1. A chuck device comprising:

a tube having a central passage and a plurality of inclined holes defined through said tube and communicating with said central passage, a plurality of recesses defined in an outer surface of said tube and communicating with said inclined holes;

a plurality of clamping members respectively inserted in said inclined holes and each clamping member having teeth defined in an outside thereof, said teeth of each of said clamping members being accessed in said recesses, and a nut mounted to said tube and having threads defined in an inner periphery thereof, said threads engaged with said teeth of said clamping members, a groove defined in said inner periphery of said nut and a plurality of balls received in said groove, a pressing ring received in said nut and positioning said balls, an engaging groove defined in said inner periphery of said nut and a C-shaped clamp engaged with said engaging groove and positioning said pressing ring.

2. The chuck device as claimed in claim 1, wherein said nut has a plurality of notches defined in an outer periphery thereof and a sleeve is mounted to said nut, said sleeve having protrusions extending from an inner periphery thereof and engaged with said notches of said nut.

3. The chuck device as claimed in claim 1, wherein said pressing ring has a curved surface on which said balls are put.

* * * * *